R. B. BENJAMIN.
SUSPENSION FITTING.
APPLICATION FILED APR. 1, 1913.
1,108,679.
Patented Aug. 25, 1914.
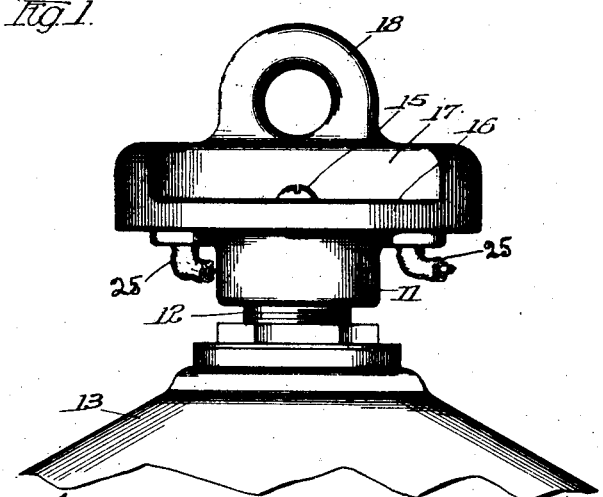
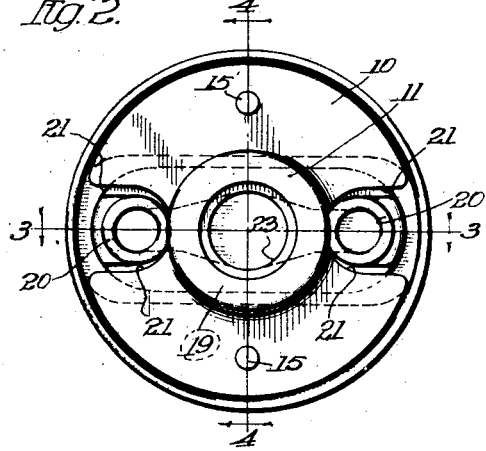
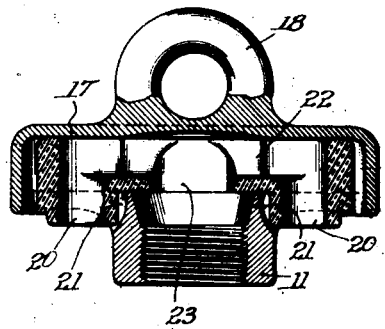
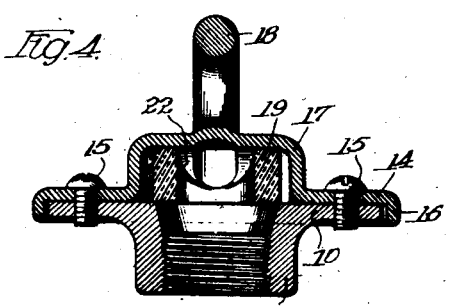
Witnesses:
Robert F. Weir
Inventor
Reuben B. Benjamin
By Jones Addington
Attys

UNITED STATES PATENT OFFICE.

REUBEN B. BENJAMIN, OF CHICAGO, ILLINOIS, ASSIGNOR TO BENJAMIN ELECTRIC MFG. COMPANY, OF CHICAGO, ILLINOIS, A CORPORATION OF ILLINOIS.

SUSPENSION-FITTING.

1,108,679.  Specification of Letters Patent.  Patented Aug. 25, 1914.

Application filed April 1, 1913. Serial No. 758,129.

*To all whom it may concern:*

Be it known that I, REUBEN B. BENJAMIN, a citizen of the United States, residing at Chicago, in the county of Cook and State of Illinois, have invented new and useful Improvements in Suspension-Fittings, of which the following is a full, clear, concise, and exact description, reference being had to the accompanying drawing, forming a part of this specification.

In some conditions of electric service, it is desirable to suspend a lamp socket or the like loosely from a cable or similar support, and when this is done it is usual to employ a conduit secured to the socket and having at its upper end a suspension fitting which is adapted to be secured to the cable or other support. It is to such suspension fitting that the present invention relates.

The principal object of the invention is to improve upon suspension fittings of this nature, to increase their safety and efficiency and to simplify their construction.

It is a further important object of the invention to provide a suspension fitting which will safeguard against abrasion of the outer coverings of the conductors, or other damage to the conductors, at the place where they enter the upper end of the conduits.

A suspension fitting constructed in accordance with my invention is shown, by way of example, in the accompanying drawing and described in the following specification. I wish it understood, however, that changes may be made in the construction described and shown, without exceeding the scope of my invention, as defined in the appended claims.

In the drawing: Figure 1 is a side elevation of the suspension fitting; Fig. 2 is an inverted plan of the same; Fig. 3 is a cross section on the line 3—3 of Fig. 2, looking in the direction of the arrows; and Fig. 4 is a cross section on the line 4—4 of Fig. 2, looking in the direction of the arrows.

Like reference characters refer to like parts throughout the following specification and the several figures of the drawings.

Referring now to the drawing, the suspension fitting includes a disk 10, formed at its center with an internally screw threaded boss 11, for receiving the upper end of the conduit 12, to the lower end of which is secured a lamp socket or the like 13. A disk-shaped cover 14 fits over the disk 10, and is removably secured thereto by means of cap screws 15. The cover 14 is formed with a flange 15 which surrounds the upper edge of the disk 10, whereby the cover sheds off any moisture which may accumulate thereon and prevents access of such moisture to the interior of the fitting. The center part of the cover 14 is extended upwardly so as to form a rectangular hollow casing 17, this casing being provided with an integral ring 18, for attaching the fitting to the cable or other supporting member. An insulating block 19 is located in the casing portion 17 of the cover 14, and is provided with two downwardly-extending hollow bushings 20. These bushings project through a pair of oppositely disposed slots 21, cut in the edge of the disk 10. The insulating block 19 is formed with a longitudinal channel 22 in its upper surface, communicating with the bushings 20, the channel terminating short of the ends of the block 19. At the center of the channel 22, the block 19 is formed with an aperture 23 of smaller diameter than the interior diameter of the boss 11, whereby the conductors are prevented from engaging against the inside of the boss 11 or the top edge of the conduit screwed therein. The conductors 25 are led into the fitting one through each of the bushings 20. From the bushings 20, the conductors pass through the channel 22 to the opening 23 through which they pass into the interior of the conduit.

The suspension fitting described above is of simple construction and may be produced at an exceedingly low cost. It may be wired with great ease and speed, and is absolutely waterproof. The provision of the bushings 20 and the making of the aperture 23 small enough to cover the inner end of the boss 11, prevents the coverings of the conductors from becoming worn or abraded by contact with the metal parts of the fitting.

Having thus fully described the nature of my invention, what I claim as new and desire to secure by Letters Patent is:

1. A suspension fitting comprising a supporting cover, a conduit-carrying member detachably connected with said cover, and an insulating member contained between said cover and said member, said insulating member having a pair of conductor-receiving bushings extending outwardly through said conduit-carrying member.

2. A suspension fitting comprising a supporting cover, a conduit-carrying member detachably connected with said cover, and an insulating member contained between said cover and said member, said insulating member having a pair of conduit-receiving bushings extending outwardly through said conduit-carrying member and being formed with a channel between said bushings, said channel having a central opening for permitting passage of the conductors to the conduit.

3. A suspension fitting comprising a supporting cover, a plate detachably connected with said cover, said plate being formed with a pair of openings and having a hollow conduit-receiving boss, and an insulating member contained between said plate and said cover, said insulating member being formed with openings for receiving conductors registering with the openings of said plate and being formed with a channel between said openings, said channel having an opening registering with said boss but of less diameter than the internal diameter of said boss, for the purposes set forth.

4. A suspension fitting comprising a supporting cover, a plate detachably connected with said cover, said plate having a hollow conduit-receiving boss, and an insulating member contained between said plate and said cover, said insulating member having a pair of conductor-receiving bushings extending outwardly through said plate and being formed with a channel between said bushings, said channel having an opening registering with said boss but of less diameter than the internal diameter of said boss, for the purposes set forth.

5. A suspension fitting comprising a disk-shaped supporting cover, said cover having a rectangular enlargement forming a casing, an elongated conductor-receiving insulating member contained in said casing, and a disk-shaped conduit-supporting member detachably secured to said cover for retaining said insulating member in position.

6. A suspension fitting comprising a flat supporting cover having a hollow enlargement at its center part, a conductor-receiving insulating member contained in said enlargement, a conduit-supporting member for retaining said insulating member in position, and screws passing through the flat portion of said cover and entering said conduit-supporting member to secure the latter in position.

7. A suspension fitting comprising a flat cover having a hollow enlargement at the center thereof, and having a downwardly-extending peripheral flange, a conductor-receiving insulating member contained in said enlargement, and a conduit-receiving member secured to said cover within the flange thereof for retaining said insulating member in position.

8. A suspension fitting comprising a flat supporting cover having a hollow enlargement at the center thereof, and having a downwardly-extending peripheral flange, a conductor-receiving insulating member contained in said enlargement, a conduit-supporting member located within said flange for retaining said insulating member in position, and screws passing through the flat portion of said cover and entering said conduit-supporting member to secure the latter in position.

9. A suspension fitting comprising a supporting cover, a conduit-carrying member detachably connected with said cover, said conduit-carrying member provided with a substantially central aperture for lead wires, and an insulating member contained between said cover and member, said insulating member having an aperture registering with the first said aperture and having a conduit therein leading from said second aperture.

10. A suspension fitting comprising a supporting cover, a conduit-carrying member detachably connected with said cover, said conduit-carrying member provided with a substantially central aperture for lead wires, and an insulating member contained between said cover and member, said insulating member having an aperture registering with but smaller than the first said aperture and having a conduit therein leading from said second aperture.

In witness whereof, I have hereunto subscribed my name in the presence of two witnesses.

REUBEN B. BENJAMIN.

Witnesses:
CHARLES I. COPE,
ANNE SOLOMON.